United States Patent
Zhu

(10) Patent No.: US 9,832,763 B2
(45) Date of Patent: *Nov. 28, 2017

(54) SIGNALLING SCHEME FOR COORDINATED TRANSMISSIONS

(71) Applicant: Fujitsu Limited, Kawasaki-shi, Kanagawa (JP)

(72) Inventor: Chenxi Zhu, Fairfax, VA (US)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/399,865

(22) PCT Filed: Mar. 14, 2013

(86) PCT No.: PCT/US2013/031568
§ 371 (c)(1),
(2) Date: Nov. 7, 2014

(87) PCT Pub. No.: WO2013/169373
PCT Pub. Date: Nov. 14, 2013

(65) Prior Publication Data
US 2015/0189626 A1   Jul. 2, 2015

Related U.S. Application Data

(60) Provisional application No. 61/645,484, filed on May 10, 2012, provisional application No. 61/645,309, filed on May 10, 2012.

(51) Int. Cl.
*H04W 4/00* (2009.01)
*H04W 72/04* (2009.01)
(Continued)

(52) U.S. Cl.
CPC .......... *H04W 72/042* (2013.01); *H04B 7/024* (2013.01); *H04L 5/0007* (2013.01);
(Continued)

(58) Field of Classification Search
USPC ............. 370/329, 252, 328, 331; 455/436; 375/219, 220, 221, 224, 259, 260, 267,
(Continued)

(56) References Cited

U.S. PATENT DOCUMENTS

2011/0038310 A1   2/2011   Chmiel et al. ............... 370/328
2011/0141987 A1   6/2011   Nam et al. .................. 370/329
(Continued)

OTHER PUBLICATIONS

U.S. Appl. No. 13/861,130, Chenxi Zhu, Signaling Scheme for Coordinated Transmissions, May 10, 2016, Allowed Claims 1-22, pp. 2-8.*

(Continued)

*Primary Examiner* — Phuongchau Ba Nguyen
(74) *Attorney, Agent, or Firm* — Baker Botts L.L.P.

(57) ABSTRACT

A method of signal transmission in a wireless communications network is disclosed. The method includes identifying a particular set of transmission points that can be utilized to transmit data to a mobile device, constructing an indexed list of the particular set of transmission points, and transmitting the indexed list to the mobile device. The method further includes selecting at least one transmission point from the particular set of transmission points to transmit data to the mobile device in a particular transmission, and transmitting to the mobile device an indicator of the index corresponding to the at least one transmission point.

6 Claims, 3 Drawing Sheets

(51) Int. Cl.
  *H04B 7/024* (2017.01)
  *H04L 5/00* (2006.01)
  *H04W 52/40* (2009.01)
  *H04W 92/10* (2009.01)

(52) U.S. Cl.
  CPC ........... *H04L 5/0091* (2013.01); *H04W 52/40* (2013.01); *H04W 72/048* (2013.01); *H04W 92/10* (2013.01)

(58) Field of Classification Search
  USPC .............................................. 375/295, 299
  See application file for complete search history.

(56) References Cited

U.S. PATENT DOCUMENTS

| | | | |
|---|---|---|---|
| 2011/0194527 A1 | 8/2011 | Lin et al. | 370/330 |
| 2011/0274047 A1 | 11/2011 | Kwon et al. | 370/328 |
| 2012/0004007 A1 | 1/2012 | Zhou et al. | 455/522 |
| 2012/0207105 A1 | 8/2012 | Geirhofer et al. | 370/329 |
| 2012/0257515 A1* | 10/2012 | Hugl | H04W 24/10 370/252 |
| 2012/0307761 A1 | 12/2012 | Zhang et al. | 370/329 |
| 2013/0287064 A1 | 10/2013 | Seo et al. | 375/144 |
| 2013/0301526 A1* | 11/2013 | Zhu | H04W 52/40 370/328 |
| 2013/0343317 A1* | 12/2013 | Etemad | H04B 7/024 370/329 |
| 2014/0079009 A1* | 3/2014 | Liu | H04W 8/26 370/329 |
| 2014/0211751 A1* | 7/2014 | Zhang | H04L 5/0044 370/330 |
| 2015/0281973 A1* | 10/2015 | Svedman | H04B 7/0691 455/454 |

OTHER PUBLICATIONS

International Search Report, Application No. PCT/US2013/031568, 6 pages, Jan. 30, 2014.
Samsung: "Design Considerations for COMP Joint Transmission," 3GPP TSG RAN WG1 Meeting #57, San Francisco, CA, USA; R1-091868; Section 2.2; 10 pages, May 4-8, 2009.
Panasonic: "Required Information at the UE in CoMP," 3GPP TSG RAN WG1 Meeting #57bis; Los Angeles, USA; R1-092530; Sections 2. 3; 2 pages, Jun. 29, 2009-Jul. 3, 2009.
Intel Corporation: "Downlink Control Signalling for DL CoMP," 3GPP TSG-RAN WG1 #68bis; Jeju, Korea; R1-121517, Section 2; 4 pages, Mar. 26-30, 2012.
Fujitsu: "Discussion of DL CoMP Control Signalling," 3GPP TSG RAN WG1 #69; Prague, Czech Republic; R1-122081; 4 pages, May 21-25, 2012.
3rd Generation Partnership Project; Technical Specification Group Radio Access Network; Evolved Universal Terrestrial Radio Access (E-UTRA); Coordinated Multi-Point Operation for LTE-A physical layer aspects (Release 11), V11.0.0, Sep. 2011.
3rd Generation Partnership Project; Technical Specification Group Radio Access Network; Evolved Universal Terrestrial Radio Access (E-UTRA); Physical channels and modulation (Release 10), TS.36. 211-a40, Dec. 2011.
3rd Generation Partnership Project; Technical Specification Group Radio Access Network; Evolved Universal Terrestrial Radio Access (E-UTRA); Multiplexing and channel coding (Release 10), TS.36. 212-a40, Dec. 2011.
3rd Generation Partnership Project; Technical Specification Group Radio Access Network; Evolved Universal Terrestrial Radio Access (E-UTRA); Physical layer procedures (Release 10), TS.36.213-a40, Dec. 2011.
Office action in Japanese Patent Application No. 2015-511461; with English translation; 4 pages, Feb. 28, 2016.
Office action in Korean Patent Application No. 2016-7001083; with English translation; 7 pages, Mar. 8, 2016.
Samsung: "CoMP Feedback including preferred-TP indicator," 3GPP TSG RAN WG1 #68bis; Jeju, Korea; R1-121622, 6 pages, Mar. 26-30, 2012.
Written Opinion of the International Searching Authority, Application No. PCT/US2013/031568, 11 pages, Jan. 30, 2014.
International Search Report and Written Opinion; PCT/US2013/040283; pp. 14, Oct. 30, 2013.
LTE; Evolved Universal Terrestrial Radio Access (E-UTRA); Physical channels and modulation (3GPP TS 36.211 version 10.4.0 Release 10), ETSI TS 136 211 V10.4.0; 104 pages, Jan. 2012.
LTE; Evolved Universal Terrestrial Radio Access (E-UTRA); Multiplexing and channel coding (3GPP TS 36.212 version 10.4.0 Release 10), ETSI TS 136 212 V10.4.0; 82 pages, Jan. 2012.
3rd Generation Partnership Project;Technical Specification Group Radio Access Network; Evolved Universal Terrestrial Radio Access (E-UTRA); Physical layer procedures (Release 10), 3GPP TS 36.213 V10.5.0; 126 pages, Mar. 2012.
LTE; Evolved Universal Terrestrial Radio Access (E-UTRA); Physical layer procedures (3GPP TS 36.213 version 10.4.0 Release 10), ETSI TS 136 213 V10.4.0; 128 pages, Jan. 2012.
3GPP Work Item Description, 3GPP RP-111365, WI/SI Coordinated Multi-Point Operation for LTE, Ran#63; 27 pages, Sep. 15, 2011.
Texas Instruments; "Downlink Control Signaling for DL CoMP"; 3GPP TSG RAN WG1 Meeting # 67; pp. 2, Nov. 14-18, 2011.
Samsung; "Downlink power allocation for CoMP"; 3GPP TSG-RAN WG1#68bis Meeting; Jeju , Korea; pp. 4, 2012.
MediaTek; "Further Discussions of Standardization Impacts on CoMP"; 3GPP TSG-RAN WG1 #66; Athens, Greece; pp. 3, 2011.
Hitachi Ltd.; "Discussion on RRM/CoMP Measurement Set Management"; 3GPP TSG-RAN WG1 #68; Dresden, Germany; pp. 4, 2012.
New Postcom; "Downlink CSI-RS signaling design for LTE-Advanced"; 3GPP TSG RAN WG1 Meeting #62; Madrid, Spain; pp. 5, 2010.
Fujitsu; "Discussion of transmission power setting for DL CoMP"; 3GPP TSG RAN WG1 #69; pp. 4, May 21-25, 2012.
Office action in Japanese Patent Application No. 2015-511461; with English translation; 4 pages, Feb. 16, 2016.
Office Action, U.S. Appl. No. 13/861,130, 8 pages, Feb. 10, 2016.
Office Action, Japanese Patent Application No. 2015-511461; with English translation; 6 pages, May 31, 2016.
"Downlink Control Signalling and Transmission Modes for CoMP," Alcatel-Lucent, Alcatel-Lucent Shanghai Bell, 3GPP TSG-RAN WG1#68bis Jeju, Korea, R1-121244, 2 pages, Mar. 26, 2012.
Office Action, Korean Patent Application No. 10-2014-7029040; with English translation; 7 pages, May 30, 2016.

* cited by examiner

SIGNALLING SCHEME FOR COORDINATED TRANSMISSIONS

RELATED APPLICATION

This application is a U.S. National Stage Application of International Application No. PCT/US2013/031568 filed Mar. 14, 2013, which designates the United States and claims benefit under 35 U.S.C. §119(e) of U.S. Provisional Patent Application No. 61/645,484, entitled "Signaling Scheme For Downlink Coordinated Multi-Point Processing" and filed 10 May 2012, and of U.S. Provisional Patent Application No. 61/645,309, entitled "Signaling Scheme For Downlink Coordinated Multi-Point Processing" and filed 10 May 2012, which are hereby incorporated by reference in their entirety.

TECHNICAL FIELD

This disclosure relates generally to communications networks and, more particularly, to wireless communications networks.

BACKGROUND

Long-Term Evolution-Advanced (LTE-A) may become the dominant standard for fourth-generation (4G) wireless technology. The current version of the LTE-A standard is Release 11, and a particular feature of Release 11 is Coordinated Multi-point Processing (CoMP). Down link (DL) CoMP is a special type transmission in which the multiple transmission antennas of one or more transmission points transmit to receiver antennas located on a mobile device, which may also be referred to as user equipment (UE).

SUMMARY

In one embodiment of the present disclosure, a method of signal transmission in a wireless communications network is disclosed. The method includes identifying a particular set of transmission points that can be utilized to transmit data to a mobile device, constructing an indexed list of the particular set of transmission points, and transmitting the indexed list to the mobile device. The method further includes selecting at least one transmission point from the particular set of transmission points to transmit data to the mobile device in a particular transmission, and transmitting to the mobile device an indicator of the index corresponding to the at least one transmission point.

In another embodiment of the present disclosure, a system for transmitting signals in a wireless communications network is disclosed. The system includes a plurality of base stations, one of which is configured to serve as a lead base station for a particular transmission, and a plurality of transmission points, each of which is associated with one of the plurality of base stations. The lead base station is configured to identify a particular set of transmission points of the plurality of transmission points that can be utilized to transmit data to a mobile device, construct an indexed list of the particular set of transmission points, and transmit the indexed list to the mobile device. The lead base station is further configured to select at least one transmission point from the particular set of transmission points to transmit data to the mobile device in a particular transmission, and transmit to the mobile device an indicator of the index corresponding to the at least one transmission point.

In yet another embodiment of the present disclosure, a method of signal transmission in a wireless communications network is disclosed. The method includes selecting a transmission point to be utilized in a particular transmission to a mobile device, and determining whether the transmission point is located in a serving cell of the mobile device. The method further includes transmitting an indicator of a signal pattern of the particular transmission to the mobile device if the transmission point is not located in the serving cell of the mobile device.

In still another embodiment of the present disclosure a system for transmitting signals in a wireless communications network is disclosed. The system includes a plurality of base stations, one which is configured to serve as a lead base station for a particular transmission, and a plurality of transmission points, each of which is associated with one of the plurality of base stations. The lead base station is configured to select a particular transmission point of the plurality of transmission points to be utilized in a transmission to a mobile device, and determine whether the particular transmission point is located in a serving cell of the mobile device. The lead base station is further configured to instruct the particular transmission point to transmit an indicator of a signal pattern of the transmission to the mobile device if the particular transmission point is not located in the serving cell of the mobile device.

BRIEF DESCRIPTION OF THE DRAWINGS

A more complete understanding of the disclosed embodiments and advantages thereof may be acquired by referring to the following description taken in conjunction with the accompanying drawings, in which like reference numbers indicate like features, and wherein.

DETAILED DESCRIPTION

Particular embodiments and their advantages are best understood by reference to FIGS. 1 through 5, wherein like numbers are used to indicate like and corresponding parts.

This disclosure sets forth methods and systems for improving transmission quality in a wireless network. For example, the methods and systems disclosed herein may be used in Long-Term Evolution-Advanced (LTE-A) Down link (DL) Coordinated Multi-point Processing (CoMP) joint transmissions to communicate the identity of transmission points involved in a particular transmission and resource element positions for a physical downlink shared channel (PDSCH).

Figure 1:
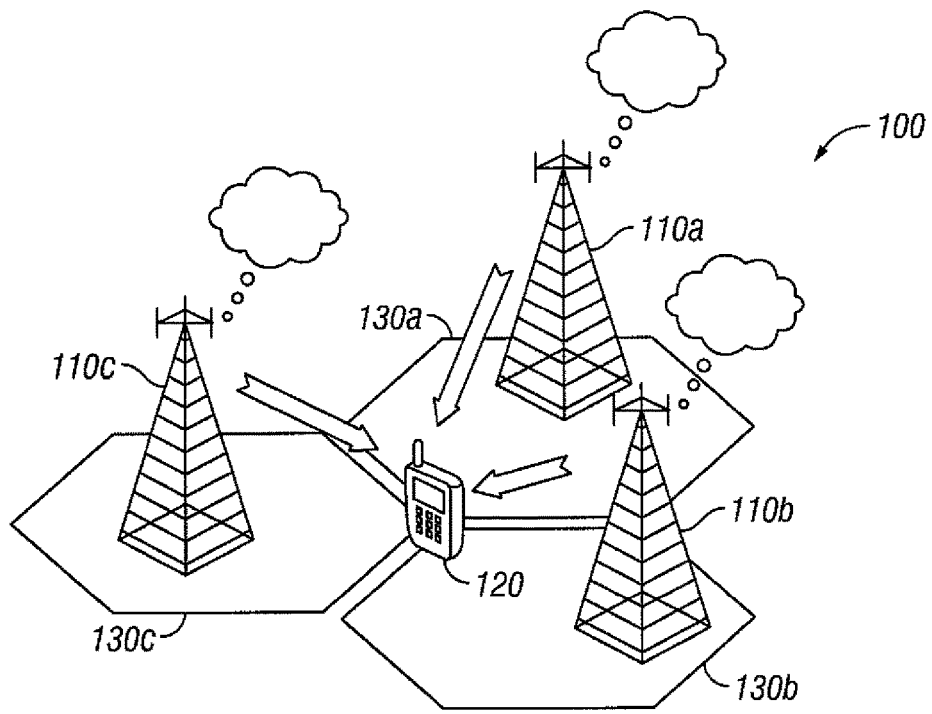
FIG. 1 is a diagram of an example wireless communications network in accordance with one embodiment of the present disclosure.

FIG. 1 illustrates an example wireless communications network 100 in accordance with the present disclosure.

Wireless communications network 100 may be a Long-Term Evolution (LTE) network, an LTE-A network, or a combination of such networks. Wireless communications network 100 may include base stations 110a, 110b, and 110c and mobile device 120. Although FIG. 1 depicts three base stations 110a, 110b, and 110c, wireless communications network 100 may include any suitable number of base stations 110. Similarly, wireless communications network 100 may include any suitable number of mobile devices 120 that communicate with base stations 110.

Base stations 110 may be referred to as Node B for 3rd generation (3G) cellular networks (e.g., Universal Mobile Telecommunications Systems or UMTS networks) or evolved Node B (eNB) for an LTE network. As shown in FIG. 1, base stations 110a, 110b, and 110c may be located in adjacent cells 130a, 130b, and 130c, respectively. Cells 130 may include both base stations 110 and non-base-station transmission points, which are not depicted in FIG. 1. Cells 130 may have any suitable shape. One of cells 130 may be designated by wireless communications network 100 as a serving cell for mobile device 120.

Base stations 110 may include any combination of hardware, software embedded in a computer readable medium, and/or encoded logic incorporated in hardware or otherwise stored (e.g., firmware) to implement any number of communication protocols that allow for wired or wireless exchange of packets in wireless communication network 100. Base stations 110 may include one or more antennas, which may also be referred to as transmission points. Transmission points may be any suitable type of antenna capable of transmitting and receiving data or signals wirelessly. For example, transmission points may include omnidirectional, sector, or panel antennas operable to transmit/receive radio signals at any suitable frequency, such as between 2 GHz and 66 GHz. Each transmission point may provide wireless coverage to a particular building, city block, neighborhood, or any other geographic area. In some embodiments, transmission points may be located remotely from base stations 110, but may nonetheless function as an extension of base stations 110.

Base stations 110 may communicate with mobile device 120 via wireless communication through the one or more transmission points. Base stations 110 may communicate with mobile device 120 using a variety of different wireless technologies, including, but not limited to, orthogonal frequency division multiple access (OFDMA) and the LTE-A protocol as defined in the 3rd Generation Partnership Project (3GPP) Release 10 or beyond. In certain embodiments, an LTE-A network may include multiple protocol layers including both physical (PHY) and logical layers (e.g., a medium-access control (MAC) layer). Data may be mapped to a particular layer based on its quality-of-service requirements.

Mobile device 120 may be a portable computer or computing device including functionality for communicating over a network. For example, mobile device 120 may be a mobile phone, a tablet computer, a laptop computer, a handheld game console, an electronic book reader, or any other suitable portable device. Mobile device 120 may also be referred to as user equipment (UE). Mobile device 120 may connect to wireless communications network 100 via one or more base stations 110 of wireless communications network 100. Communications between mobile device 120 and wireless communications network 100 may be single-point to single-point (e.g., between one or more antennas of a single base station 110 and one or more antennas of mobile device 120). Alternatively, communications between mobile device 120 and wireless communications network 100 may be multi-point to single-point (e.g., between one or more antennas of multiple base stations 110 and one or more antennas of mobile device 120).

Multi-point to single-point transmissions may be accomplished through down link coordinated multi-point processing (DL CoMP), wherein multiple transmitting antennas are located at multiple geographically separated locations. For example, data for mobile device 120 may be available at multiple geographically separated points in wireless communications network 100. The data may be transmitted to mobile device 120 at the same time through coordination among the multiple transmission points. For example, in a joint transmission involving three base stations 110, there may be multiple transmission points that transmit to mobile device 120 simultaneously in the same physical resource block. In each joint transmission, one of the base stations 110 may be designated as the lead, or controlling, base station 110. For example, the lead base station 110 may coordinate the transmissions from the base stations 110 participating in the joint transmission, encode the data to be transmitted to mobile device 120, and send the encoded data to the transmission points participating in the joint transmission. As another example, the lead base station 110 may select a particular base station 110 to transmit to mobile device 120 and send the encoded data to the particular base station 110.

Figure 2:
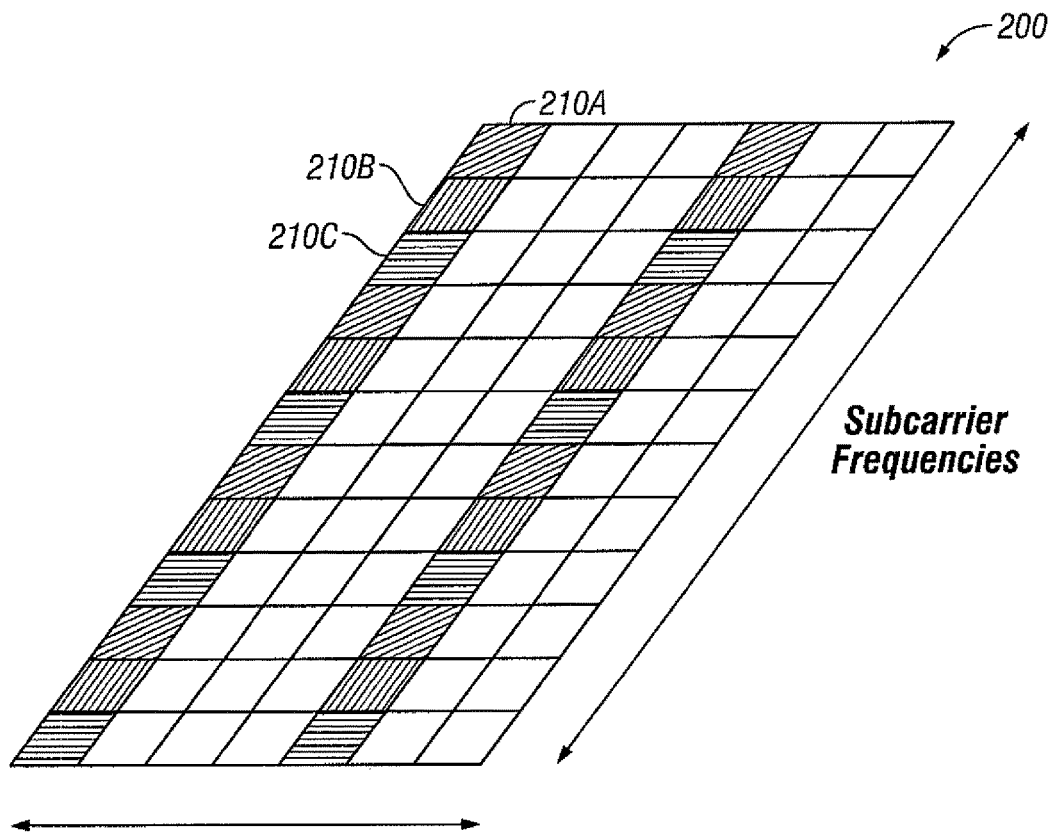
FIG. 2 is a diagram of an example allocation of resource elements of a radio frame in accordance with one embodiment of the present disclosure.

FIG. 2 illustrates an example physical resource block 200 in accordance with the present disclosure. Physical resource block 200 may include a plurality of resource elements 210 of a radio head, which may be part of a base station 110 or other non-base-station transmission point. In an LTE-A communication network, a physical resource block may include twelve contiguous subcarrier frequencies, each transmitting six or seven data symbols, referred to as orthogonal frequency division multiplex (OFDM) symbols, in a given amount of time. An OFDM symbol may be a complex number with real or imaginary components that map a group of bits to one or more modulation characteristics of a carrier wave transmitted at a particular subcarrier frequency.

Various types of information may be sent to mobile device 120 via the resource elements 210 of physical resource block 200. For example, one or more base stations 110, each having at least one transmission point, may send data traffic and control traffic to mobile device 120 using physical layers of wireless communications network 100. The physical layers may include, for example, a physical downlink shared channel (PDSCH) and/or a physical downlink control channel (PDCCH), as defined in the LTE-A protocol. Data traffic may, for example, include information that a base station 110 receives from wireless communications network 100 or from another base station 110. As an example, data traffic may be sent to mobile device 120 via the PDSCH.

Control traffic, on the other hand, may be used to establish and maintain a connection between one or more transmission points and mobile device 120. Control traffic may include information that allows mobile device 120 to extract relevant data traffic from transmissions sent from base stations 110. As an example, control traffic may be sent to mobile device 120 via the PDCCH.

For example, control traffic may include Channel State Information Reference Signals (CSI-RS), which may be transmitted periodically by a transmission point associated with each base station. For example, each base station 110a, 110b, and 110c may include a transmission point TP1, TP2, and TP3, respectively, each of which transmits a CSI-RS. CSI-RS may be used by mobile device 120 to obtain channel-state information (e.g., information regarding the channels on which a mobile device can receive transmissions). Mobile device 120 may report which CSI-RS signals it receives to the lead base station 110. Based on this information, the lead base station may determine which transmission points may be used to transmit data to mobile device 120.

Additionally, control traffic may include cell-specific reference signals (CRS), which may be transmitted by a transmission point associated with each base station. Each base station 110a, 110b, and 110c may, for example, include a transmission point TP1, TP2, and TP3, respectively, which may transmit its own CRS. The particular set of resource elements in which each transmission point transmits CRS may be fixed. For example, TP1 may transmit a first CRS (CRS1) in resource elements 210a, TP2 may transmit a second CRS (CRS2) in resource elements 210b, and TP3 may transmit a third CRS (CRS3) in resource elements 210c.

Control traffic may also include demodulation reference signals (DM-RS). In certain embodiments each transmission point involved in a joint transmission may transmit DM-RS. The DM-RS transmitted from each transmission point in a joint transmission may be the same DM-RS sequence. Mobile device 120 may use the DM-RS to calculate the effective channel on which data is being transmitted to mobile device 120. In a joint transmission with three transmission points, the effective channel may be represented by the following equation:

$$D = \sum_{k=1}^{3} H_k W_k$$

where H is the estimated channel for each transmission point and W is the precoding matrix for each transmission point.

If mobile device 120 is not aware of all the transmission points involved in the joint transmission, it may experience an error receiving and/or decoding the transmitted data. For example, mobile device 120 may attempt to treat as data and decode the symbols mapped to the resource elements allocated to the unknown transmission points for the transmission of CRS. This may result in a decoding error and thus data loss. The impact of these issues may be reduced through the implementation of a signaling scheme that enables mobile device 120 to be notified of both the transmission points involved in a particular transmission and the resource elements allocated to those transmission points for the transmission of CRS.

One method of notifying mobile device 120 of the transmission points involved in the joint transmission may involve, for example, including an indicator of transmission point (or points) in the Downlink Control Information (DCI) of the transmission. This method may, however, result in increased DCI overhead. To reduce DCI overhead, a signaling scheme combining logical layer signaling with DCI signaling may be implemented. Such a signaling scheme is discussed in detail in conjunction with FIG. 3.

A mobile device 120 may also experience data loss if it is not informed of the resource element position of the first PDSCH symbol for each transmission point involved in a particular transmission. To avoid this problem, an indicator of the position of the first PDSCH symbol may be appended to a control signal for the particular transmission. This method is discussed in detail in conjunction with FIGS. 4 and 5.

Figure 3:
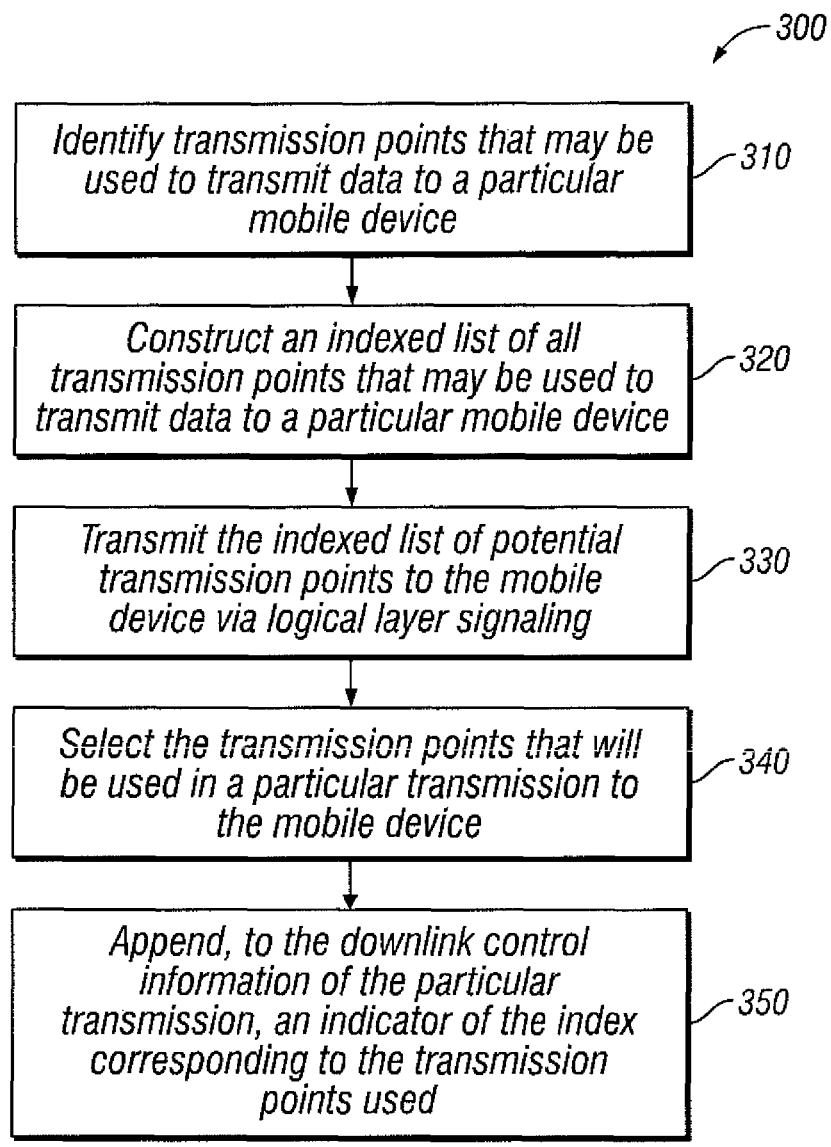
FIG. 3 is a flow chart of an example method for signal transmission in a wireless communications network in accordance with one embodiment of the present disclosure.

FIG. 3 illustrates an example method 300 for notifying mobile device 120 of the transmission points involved in a particular transmission and the resource elements allocated to those transmission points for the transmission of CRS. At step 310, the lead base station may identify a set of transmission points that may be utilized to transmit data to a particular mobile device. As discussed above, each transmission point may periodically transmit a CSI-RS. The mobile device may report which CSI-RS signals it receives to the lead base station, and, based on that information, the lead base station may determine which transmission points can be utilized to transmit data to the mobile device. At step 320, the lead base station may construct an indexed list of all the transmission points that may be utilized to transmit data to the mobile device in a joint transmission. In some embodiments, the indexed list may include the identity of each potential transmission point as well as information regarding the resource elements allocated to each potential transmission point for the transmission of CRS. At step 330, the indexed list of potential transmission points may be transmitted to the mobile device via logical layer signaling. Logical layer signaling may be utilized to reduce DCI overhead.

At step 340, the lead base station may select, from the set of potential transmission points, the transmission points that will be utilized in a particular transmission to the mobile device. The wireless communication network may be configured such that only those transmission points appearing on the indexed list of potential transmission points may be utilized to transmit data to the mobile device. At step 350, an indicator of the transmission points that will be utilized in the particular transmission may be appended to the DCI for the transmission. The indicator may, for example, include the index numbers corresponding to the transmission points utilized in the particular transmission. In this manner, the mobile device may be notified of the transmission points involved in the particular data transmission and the resource elements allocated to each of those transmission points for the transmission of CRS.

As discussed above, mobile device 120 may also experience data loss if it is not informed of the resource element position of the first PDSCH symbol for each of the transmission points involved in a particular transmission. Each resource element allocated to a particular transmission point may include control symbols, such as PDCCH symbols and/or data symbols, such as PDSCH symbols. PDCCH symbols and PDSCH symbols may be arranged in a particular pattern depending on the cell in which a transmission point is located. For example, transmission points in the same cell may have the same pattern of PDCCH symbols and PDSCH symbols, while transmission points in a different cell may have a different pattern.

Figure 4:
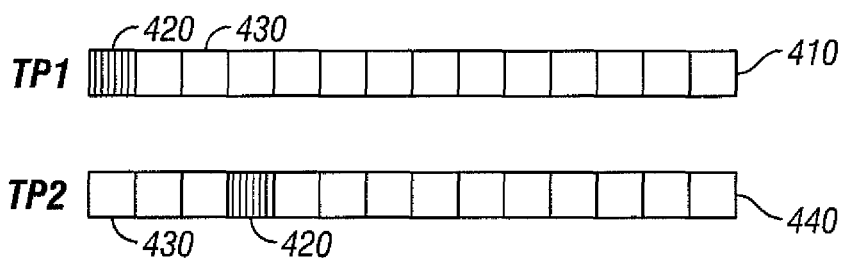
FIG. 4 is a diagram of an example allocation of resource elements between control and data symbols in accordance with another embodiment of the present disclosure.

FIG. 4 illustrates a portion of a physical resource block 410 including resource elements allocated to a first transmission point (TP1), which may be located in a first cell, and portion of a physical resource block 440 including resource elements allocated to a second transmission point (TP2), which may be located in a second cell. The resource elements allocated to TP1 may include a PDCCH symbol 420 followed by several PDSCH symbols 430. The resource elements allocated to TP2, on the other hand, may include a PDCCH symbol 420 sandwiched between several PDSCH symbols 430.

Each transmission point may transmit on the physical control format indicator channel (PCFICH) an indicator of the resource element position of the first PDSCH symbol for the particular cell in which the transmission point is located.

Mobile device 120 may receive PCFICH transmissions from transmission points located in the serving cell of mobile device 120, but may not receive PCFICH transmissions from transmission points located outside the serving cell. Thus, mobile device 120 may be notified via PCFICH transmissions of the resource element position of the first PDSCH symbol where the transmission involves transmission points within the serving cell of mobile device 120. Mobile device 120 may not be notified of the resource element position of the first PDSCH symbol, however, where the transmission involves transmission point(s) located outside the serving cell.

Consider for example, a transmission involving a single transmission point located outside the serving cell of mobile device 120. Because mobile device 120 does not receive PCFICH transmissions from transmission points located outside its serving cell, mobile device 120 may not be notified of the resource element position of the first PDSCH symbol for the transmission point. To avoid this issue, an indicator of the resource element position of the first PDSCH symbol for the transmission point may be included in the PDCCH DCI of the transmission point. The indicator may, for example, be a two-bit indicator equivalent to that transmitted by the transmission point on the PCFICH.

As another example, consider a transmission involving multiple transmission points located outside the serving cell of mobile device 120. Because mobile device 120 does not receive PCFICH transmissions from transmission points outside its serving cell, mobile device 120 may not be notified of the resource element position of the first PDSCH symbol for the transmission point. To avoid this issue, an indicator may be included in the PDCCH DCI of each transmission point involved in the transmission. The indicator may, for example, indicate the resource element position of the first PDSCH symbol for the transmission point at which the first PDSCH symbol occurs the latest of the transmission points involved in the transmission. Consider, for example, the two transmission points (TP1 and TP2) discussed with respect to FIG. 4. The first PDSCH symbol for TP1 occurs in the third resource element and the first PDSCH symbol for TP2 occurs in the second resource element. Thus, the first PDSCH symbol for TP1 occurs later than the first PDSCH symbol for TP2. As a result, an indicator of the position of the first PDSCH symbol for TP1 may be included in the PDCCH DCI for both TP1 and TP2.

On the other hand, where a transmission involves transmission point(s) located in the serving cell of mobile device 120, the PCFICH transmissions from each transmission point may notify the mobile device 120 of the resource element position of the first PDSCH symbol for all transmission points within the serving cell. As a result, no additional signaling may be necessary.

Figure 5:
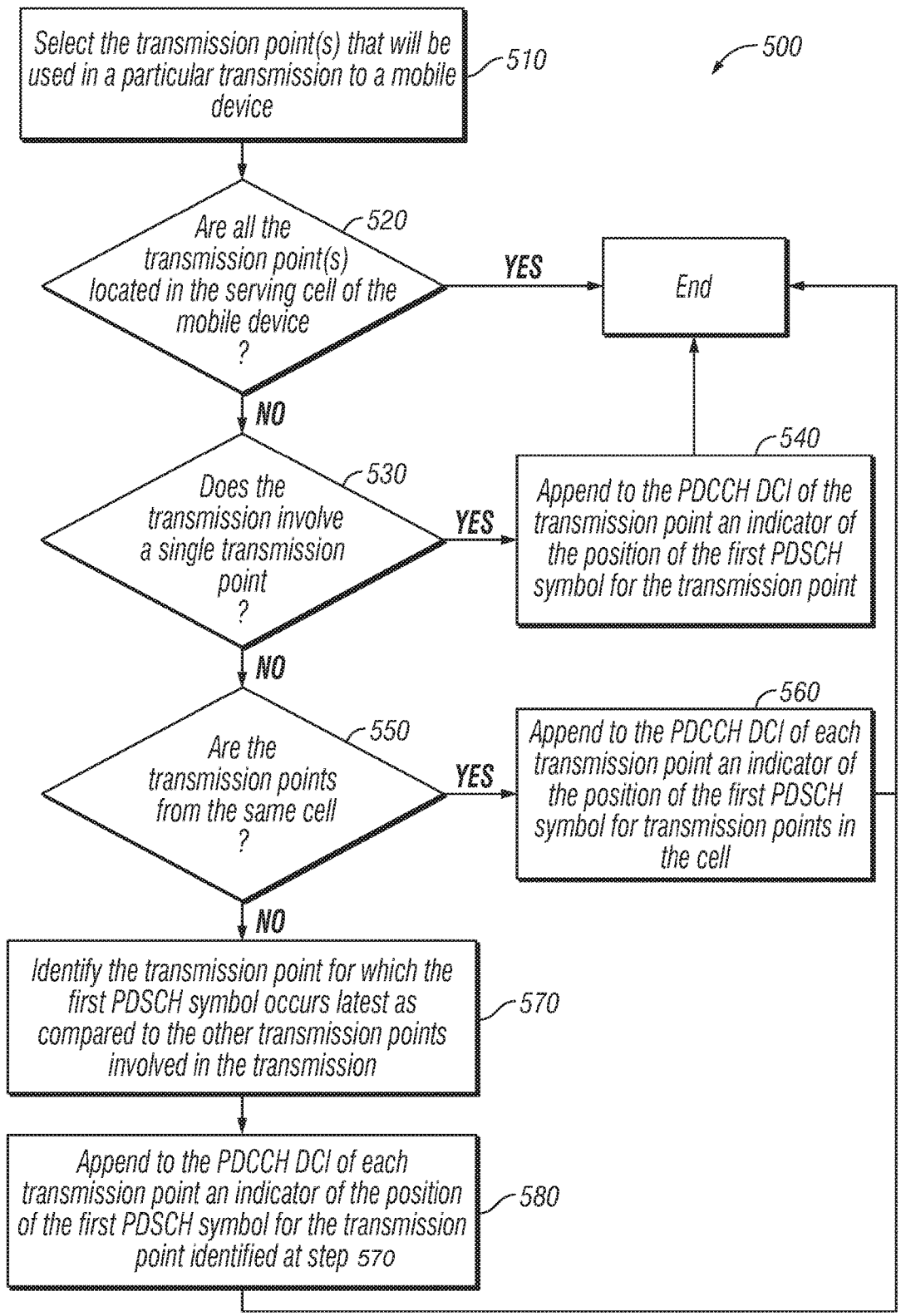
FIG. 5 is a flow chart of an example method for signal transmission in a wireless communications network in accordance with another embodiment of the present disclosure.

FIG. 5 illustrates an example method 500 of notifying a mobile device of the resource element the position of the first PDSCH symbol for a particular transmission point. At step 510 the lead base station may select the transmission points that will be utilized in a particular transmission to the mobile device. As discussed above, the wireless communication network may be configured such that only those transmission points appearing on the indexed list of potential transmission points may be utilized to transmit data to the mobile device. At step 520, the lead base station may determine whether the transmission point(s) involved in a particular transmission are located in the serving cell of the mobile device. If the transmission point(s) are located in the serving cell of the mobile device, no additional signaling may be necessary and the method may end. If, on the other hand, one or more of the transmission points involved in the transmission are not located in the serving cell of the mobile device, the method may proceed to step 530.

At step 530, the lead base station may determine whether the particular transmission involves a single transmission point. If so, the method may proceed to step 540. At step 540, an indicator of the resource element position of the first PDSCH symbol for the transmission point may be appended to the PDCCH DCI of the transmission. As discussed above, this step may be necessary because the mobile device does not receive PCFICH transmissions from transmission points located outside the serving cell of the mobile device, and thus may not be notified of the resource element position of the first PDSCH symbol for the transmission point. Following step 540, the method may end.

If, on the other hand, the lead base station determines at step 530 that the particular transmission involves multiple transmission points, the method may proceed to step 550. At step 550, the lead base station may determine whether the transmission points involved in the particular transmission are from the same cell. If so, the method may proceed to step 560. At step 560, an indicator of the resource element position of the first PDSCH symbol for transmission points in the cell may be appended to the PDCCH DCI of each transmission point involved in the particular transmission. As discussed above, this step may be necessary because the mobile device does not receive PCFICH transmissions from transmission points located outside the serving cell of the mobile device, and thus may not be notified of the resource element position of the first PDSCH symbol for the transmission point. Following step 560, the method may end.

If, on the other hand, the lead base station determines at step 550 that the transmission points involved in the particular transmission are not from the same cell, the method may proceed to step 570. At step 570, the lead base station may identify the transmission point for which the first PDSCH symbol occurs the latest as compared to the other transmission points involved in the particular transmission. At step 580, an indicator of the resource element position of the first PDSCH symbol for the transmission point identified at step 570 may be appended to the PDCCH DCI for each transmission point involved in the particular transmission. Following step 580, the method may end.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present invention have been described in detail, it should be understood that the various changes, substitutions, and alterations could be made hereto without departing from the spirit and scope of the invention.

What is claimed is:
1. A method of signal transmission in a wireless communications network including a plurality of base stations, one of the plurality of base stations configured to serve as a lead base station for a particular transmission and a plurality of transmission points, each transmission point associated with one of the plurality of base stations, wherein the lead base station is configured to perform the method comprising:
   selecting a transmission point to be utilized in a particular transmission to a mobile device;
   determining whether the transmission point is located in a serving cell of the mobile device;

transmitting an indicator of a signal pattern of the particular transmission to the mobile device if the transmission point is not located in the serving cell of the mobile device;
selecting an additional transmission point to be utilized in the particular transmission;
determining whether the additional transmission point is located in the serving cell of the mobile device; and
transmitting an indicator of a signal pattern of the particular transmission to the mobile device if the transmission point and the additional transmission point are not located in the serving cell of the mobile device,
wherein transmitting an indicator of a signal pattern of the particular transmission to the mobile device comprises:
identifying a first resource element position, the first resource element position being a resource element position at which the transmission point is configured to begin data transmission;
identifying a second resource element position, the second resource element position being a resource element position at which the additional transmission point is configured to begin data transmission;
determining which of the first resource element position and the second resource element position occurs later in time;
appending to a control signal of the particular transmission an indicator of the resource element position that occurs later in time; and
transmitting the control signal to the mobile device from the transmission point and the additional transmission point.

2. The method of claim 1, wherein transmitting the indicator to the mobile device comprises:
appending to a control signal of the particular transmission an indicator of a resource element position at which the transmission point is configured to begin data transmission; and
transmitting the control signal to the mobile device.

3. The method of claim 2, wherein the control signal comprises down-link control information transmitted on a physical downlink control channel.

4. A system for transmitting signals in a wireless communications network, the system comprising:
a plurality of base stations, one of the plurality of base stations configured to serve as a lead base station for a particular transmission; and
a plurality of transmission points, each transmission point associated with one of the plurality of base stations;
wherein the lead base station is configured to:
select a particular transmission point of the plurality of transmission points to be utilized in a transmission to a mobile device;
determine whether the particular transmission point is located in a serving cell of the mobile device;
instruct the particular transmission point to transmit an indicator of a signal pattern of the transmission to the mobile device if the particular transmission point is not located in the serving cell of the mobile device;
select an additional transmission point to be utilized in the particular transmission;
determine whether the additional transmission point is located in the serving cell of the mobile device;
instruct the additional transmission point to transmit an indicator of a signal pattern of the particular transmission to the mobile device if the transmission point and the additional transmission point are not located in the serving cell of the mobile device;
identify a first resource element position, the first resource element position being a resource element position at which the transmission point is configured to begin data transmission;
identify a second resource element position, the second resource element position being a resource element position at which the additional transmission point is configured to begin data transmission;
determine which of the first resource element position and the second resource element position occurs later in time;
append to a control signal of the particular transmission an indicator of the resource element position that occurs later in time; and
instruct the transmission point and the additional transmission point to transmit the control signal to the mobile device.

5. The system of claim 4, wherein transmitting the indicator to the mobile device comprises:
appending to a control signal of the transmission an indicator of a resource element position at which the particular transmission point is configured to begin data transmission; and
transmitting the control signal to the mobile device.

6. The system of claim 5, wherein the control signal comprises down-link control information transmitted on a physical downlink control channel.

* * * * *